April 27, 1954     C. A. THOMAS     2,676,560
MILKER SYSTEM
Filed March 27, 1952
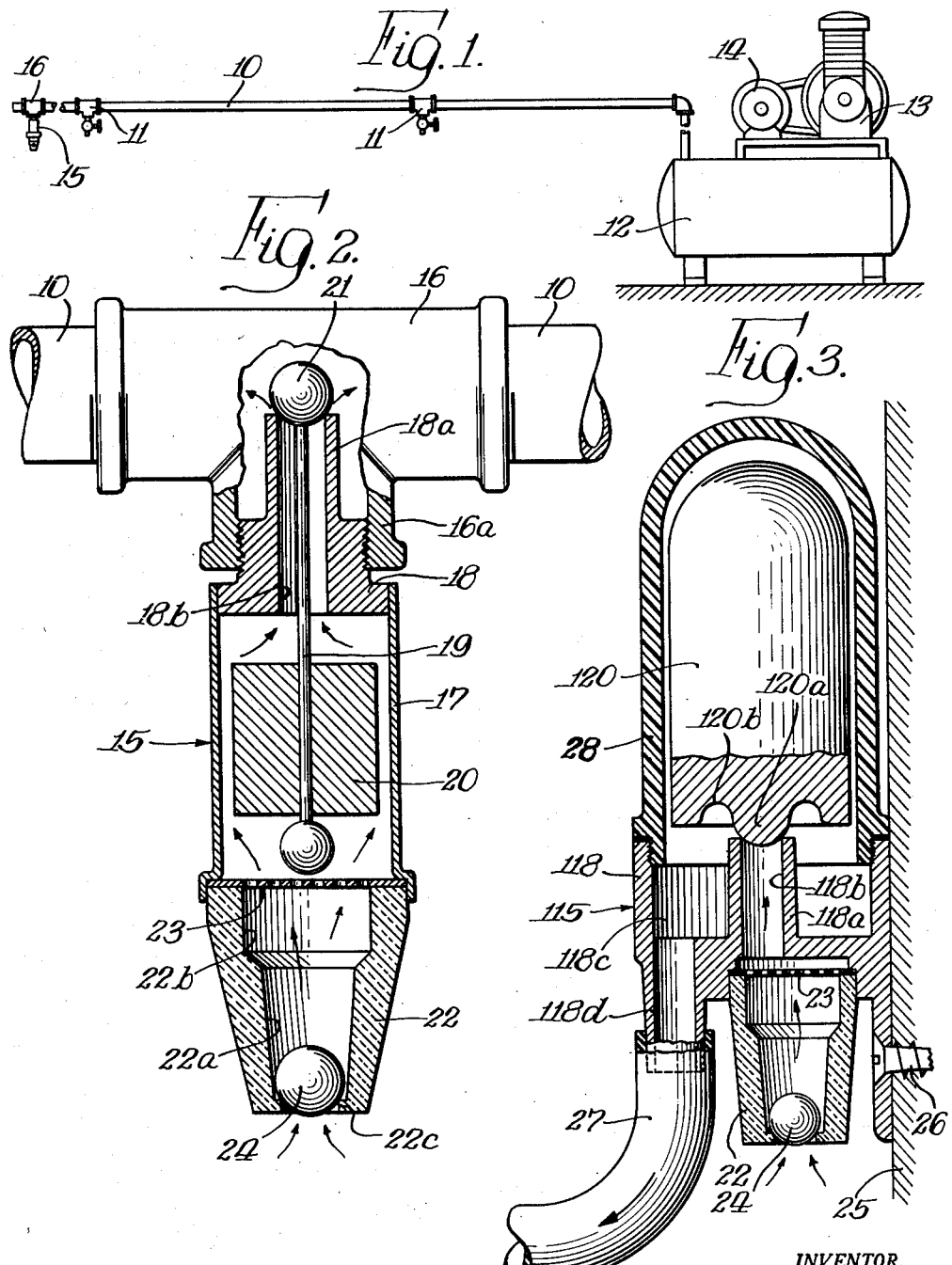
INVENTOR.
Chester A. Thomas,
BY
Schroeder, Merriam, Hofgren & Brady
Atty's.

Patented Apr. 27, 1954

2,676,560

UNITED STATES PATENT OFFICE 2,676,560

MILKER SYSTEM

Chester A. Thomas, Lake Forest, Ill., assignor to Babson Bros. Co., a corporation of Illinois Application March 27, 1952, Serial No. 278,831

6 Claims. (Cl. 116—117)

This invention relates to a vacuum operated milker system including a vacuum line with connections thereon for removably connecting a mechanical milker thereto.

In a dairy barn of the type wherein each cow is milked by machine in her own stall vacuum for operation of the machine is derived from a vacuum pipe line that is ordinarily installed just above the row of stalls. The vacuum apparatus of the milker system ordinarily comprises a source of vacuum such as a vacuum tank, a vacuum pump and a motor and the pipe line is connected to the tank. This line is generally provided with a series of stall cocks or connections so that the milking machine hose may be attached thereto.

In the past it has been customary to provide a vacuum relief valve in the line arranged to open at a certain predetermined vacuum in order to prevent excessive vacuum being built up in the system. It has also been customary to provide a vacuum gauge on the line so that the operator can check the vacuum from time to time to see if the system is operating correctly and to see that the vacuum is neither too high nor too low. Ordinarily the major source of trouble in such a milker system is a failure of the vacuum or a lowering of the vacuum to such a point that efficient milking is not obtained. Among the many sources of such failures are leaks in the line or the hoses to the units or in the units themselves, particularly around the lid gasket, the clogging of the line, insufficient vacuum pump capacity for the number of units being operated by the pump, and similar failures. One obvious source of failure of the vacuum is the fact that the vacuum pump is not operating.

All these failures or harmful lowering of vacuum have been checked in the past by the use of a vacuum gauge in the system in combination with the vacuum relief valve. This has never been too satisfactory, however, as such a gauge is a very delicate instrument and also requires constant surveillance by the operator. Furthermore, it has been necessary that the operator make frequent trips to the gauge to be sure that everything is working satisfactorily. The vacuum gauges are easily damaged so that the gauge is often inaccurate and the usual unskilled farm operator does not ordinarily immediately detect this fact. Furthermore, vacuum gauges are ordinarily relatively expensive and their repairs are also expensive.

The vacuum operated milker system of this invention avoids the above difficulties as it avoids the use of the delicate and expensive gauge heretofore employed. One of the features of this invention is to provide an apparatus comprising a valve connectable to the vacuum line of the milker system and arranged to open at a predetermined vacuum to vent air into the line and an indicator activated by operation of the valve to indicate this operation, the operation of the indicator being visible from a considerable distance. A more specific feature of this invention is to provide apparatus comprising an air conduit connectable to the vacuum line, a valve in this conduit opening at a predetermined vacuum to vent air into the line, a transparent extension member on the conduit through which air flows when the valve is open and having a passage therein increasing in diameter from the outer end toward the inner end thereof, a light weight ball in said passage having a diameter greater than the minimum diameter and less than the maximum diameter of the passage, the ball being moved inwardly by air flowing inwardly through the extension member, conduit and open valve to operate as an indicator and being contrastingly colored so that its movement is visible from a considerable distance, and a screen in the extension member at the inner end thereof serving to limit the extent of movement of the ball and intercept foreign material carried by the flowing air. Other features and advantages of the invention will be apparent from the following description of certain embodiments thereof taken in conjuction with the accompanying drawings.

Of the drawings:

Figure 1 is a semi-diagrammatic elevation illustrating one embodiment of the invention.

Figure 2 is a fragmentary longitudinal section through the vacuum relief and indicator device of Figure 1.

Figure 3 is a view somewhat similar to Figure 2 but illustrating a second embodiment of the invention.

In the apparatus of this invention there is provided a valve connectable to the vacuum line and arranged to open at a predetermined vacuum, such as 15 inches of mercury, to vent air into the line and an indicator activated by operation of this valve to indicate this operation. The indicator is visible from a considerable distance so that the operator can check the operation of the system by the movement of the indicator from relatively great distances away by merely glancing to see if it is moving. In a specific form of the invention the vented air flowing into the vacuum line around the valve flows through a conduit having at least a portion thereof made of a transparent material. Located within this conduit at the transparent portion thereof is a light weight movable member such as a ball which is caused to move continuously so long as the valve is venting air into the line. This ball which is preferably of a striking or contrasting color is easily visible from considerable distances. Thus this arrangement not only avoids the use of the expensive, complicated and delicate vacuum gauge formerly required but also provides an indicator that can be easily seen.

The apparatus of this invention has many advantages over previous arrangements. Thus it not only relieves the vacuum to maintain a desired vacuum setting but also provides an indicator that can be seen from considerable distances to show that the system is operating satisfactorily. Furthermore, in contrast to prior arrangements, the vacuum relief and indicator device is quite rugged so that it has an extremely long life requiring minimum servicing. The apparatus is easy to dismantle for cleaning and is relatively inexpensive to manufacture and to maintain. Furthermore, there is nothing that requires periodic readjustment as is true with the ordinary vacuum gauge and the device provides, in its preferred form, a screen for keeping foreign material out of the system. One of the chief advantages of the new device is that all moving parts can be relatively loose fitting so that wear of these parts is no problem and there is no necessity for careful machining of complicated surfaces, no lubrication problems and the cost of the device is quite low.

In the embodiment shown in Figures 1 and 2 the vacuum system includes a vacuum line 10 provided with a plurality of spaced stall cocks 11 which may be of the ordinary hand operated valve type and a vacuum tank 12 to which the line 10 is connected and serving as a source of vacuum. Vacuum is maintained in this tank by an ordinary vacuum pump 13 operated by the usual electric motor 14.

Attached to the vacuum line 10 at the end remote from the tank 12 is a vacuum relief valve and indicator 15. This apparatus 15 is connected through a T-connection 16 to the pipes forming the vacuum line 10 and includes a tubular metal body portion 17 attached at its upper end to a threaded plug 18 held in the extending part 16a of the connection 16. This plug 18 has a neck part 18a extending inwardly of the connection 16 and the plug 18 including this part 18a is provided with a centrally located passage 18b.

Extending into and through the passage 18b is a support shaft 19 having attached to the lower end thereof within the body portion 17 a weight 20. As is shown in Figure 2 the sides of this weight are spaced from the walls forming the member 17 so as to provide an air passage around the weight and to permit lateral movement thereof. The upper or inner end of the support shaft 19 is provided with a ball valve closure 21 adapted to seat on the upper end of the neck 18a and close the passage 18b when the vacuum within the line 10 is below a certain predetermined value such as 15 inches of mercury. The weight 20, support shaft 19, closure 21 and cross sectional area of the passage 18b are so proportioned that as soon as the vacuum within the system exceeds this predetermined value the atmospheric air pressure on the bottom of closure ball 21 will raise this ball against the force of the weight 20 and associated parts to bleed air into the vacuum line. This air flows around the weight 20 into the passage 18b around the shaft 19 and around the raised ball valve closure 21. The apparatus thus acts as a vacuum relief valve to prevent the vacuum in the system exceeding the desired predetermined value.

The bottom or outer end of the tubular body portion 17 has attached thereto a transparent extension member 22 preferably made of a synthetic plastic material such as a vinyl polymer; for example, Vinylite. Between the inner end of this member 22 and the body portion 17 there is preferably provided a perforated transverse plate 23.

As is shown in Figure 2 the member 22 is provided with a longitudinal passage 22a tapering upwardly and outwardly from the bottom of this member toward the top thereof. Somewhat more than half way up this member the passage 22a is considerably expanded to form the upper passage portion 22b. The bottom of the passage 22a is provided with an inwardly extending annular shelf portion 22c serving to retain a light weight ball 24 within the passage 22a.

The ball 24 which is preferably made of a light weight material such as rubber has a diameter greater than the minimum diameter of the passage 22a which in this instance is the diameter defined by the shelf 22c but considerably less than the maximum diameter of either the passage 22a or the enlarged part 22b of this passage. The ball which is extremely light in weight will be at rest in the position shown in Figure 2 so long as the valve closure member 21 closes the upper end of the passage 18b. As soon as the vacuum in the system exceeds the predetermined value, however, which in one instance is 15 inches of mercury, the closure 21 will be displaced inwardly by air pressure thereon so that air will flow through the bottom of the extension 22, through the screen 23, around the weight 20 and through the passage 18b into the vacuum line 10. This flowing air will cause the ball 24 to move violently within the transparent extension 22. As the extension member 22 is transparent the activity of the ball is easily observed from a considerable distance away. The ball 24, therefore, functions as an indicator to show that the system is operating satisfactorily and that the vacuum within the system is at the desired value. As is well known, the vacuum in such a system does not remain constant but surges under changing conditions so that when the milker system is operating efficiently the valve 21 will be constantly opening and closing. This opening and closing will cause violent agitation in the indicator ball 24 which will be easily observed. In order to aid observation of the indicator ball 24 from a maximum distance, it is preferred that this ball have a striking or contrasting color such as black.

The screen 23 not only serves to limit the extent of the upward movement of ball 24 to keep it confined within the transparent member 22 but also acts as a filter screen to remove large particles of foreign material.

As was pointed out above, the embodiment of the invention illustrated in Figures 1 and 2 is attached to and forms a part of the vacuum line 10. In Figure 3 the vacuum relief valve and indicator 115 is shown as attached to a wall 25 by screws 26 and is adapted to be connected by means of a rubber hose 27 or similar connecting member to the line 10 either through one of the stall cocks 11 or by a special valve. This embodiment also employs the transparent extension member 22, ball indicator 24 and perforated screen 23. The inlet air passage 118b is formed in an upwardly extending neck 118a with an annular space 118c being provided around the member 118a. The outer portion of this annular space is defined by a body member 118 which has attached to the top thereof an inverted cup-shaped transparent housing 28. Loosely fitted within this housing is a weighted member 120 having a spherically curved bottom part 120a adapted to press down against and close the upper opening of the passage 118b and operate as a valve. As is shown, this valve closure part 120a is surrounded by a smoothly curved annular raised trough 120b. Here again the dimensions of the parts and the mass of the weight 120 are so proportioned that the vacuum in the system operating through the rubber hose 27 that is connected to a downwardly extending portion 118d and thus to the space 118c is maintained substantially constant at the desired predetermined value. When the vacuum exceeds this value air pressure acting on the bottom of the value closure part 120a will raise the weight 120 within the housing 28 and vent air from the outside into the system. Air flowing through the transparent member 22 will cause violent agitation of the indicator ball 24 in the manner explained above and this agitation can be observed from considerable distances to show that the system is operating satisfactorily.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a vacuum operated milker system including a vacuum line, apparatus comprising: a valve connectable to the vacuum line and arranged to open at a predetermined vacuum to vent air into the line; and an indicator viewable from any point in a large surrounding area and activated by operation of said valve to indicate said operation, the operation of said indicator being visible from a considerable distance.

2. In a vacuum operated milker system including a vacuum line, apparatus comprising: a valve connectable to the vacuum line and arranged to open at a predetermined vacuum to vent a stream of air into the line; and an indicator activated by said air stream and moving substantially continuously when the valve is open to indicate the opening of said valve, the operation of the indicator being visible from a considerable distance.

3. In a vacuum operated milker system including a vacuum line, apparatus comprising: a fluid conduit connectable to the vacuum line; a valve in said conduit opening at a predetermined vacuum to vent air from the atmosphere through the conduit into the line; and an indicator within the conduit activated by the flow of air through the conduit and open valve to indicate that said valve is open, the operation of the indicator being visible from a considerable distance.

4. In a vacuum operated milker system including a vacuum line, apparatus comprising: a fluid conduit connectable to the vacuum line; a valve in said conduit opening at a predetermined vacuum to vent air from the atmosphere through the conduit into the line; a transparent member forming a part of said conduit through which air is drawn when the valve is open; and an indicator in said transparent member activated by the flow of air through the conduit and open valve to indicate that said valve is open, the operation of the indicator being visible from a considerable distance.

5. In a vacuum operated milker system including a vacuum line, apparatus comprising: an air conduit connectable to the vacuum line; a valve in said conduit opening at a predetermined vacuum to vent air into the line; a transparent extension member on said conduit through which air flows when the valve is open; a light weight ball in said extension member moved by air flowing therethrough to operate as an indicator, the ball being contrastingly colored so as to make its movement visible from a considerable distance; and means retaining said ball for movement within said extension member.

6. In a vacuum operated milker system including a vacuum line, apparatus comprising: an air conduit connectable to the vacuum line; a valve in said conduit opening at a predetermined vacuum to vent air into the line; a transparent extension member on said conduit through which air flows when the valve is open and having a passage therein increasing in diameter from the outer end toward the inner end thereof; a light weight ball in said passage having a diameter greater than the minimum diameter and less than the maximum diameter of the passage, said ball being moved inwardly by air flowing inwardly through the extension member, conduit and open valve to operate as an indicator and being contrastingly colored so that its movement is visible from a considerable distance; and a screen in the extension member at the inner end thereof serving to limit the extent of movement of the ball and intercept foreign material carried by the flowing air.

References Cited in the file of this patent

UNITED STATES PATENTS

| Number | Name | Date |
|---|---|---|
| 1,125,348 | Lawrence | Jan. 19, 1915 |
| 1,730,118 | Cobb | Oct. 1, 1929 |